(12) United States Patent
Bai (10) Patent No.: US 11,061,294 B1
(45) Date of Patent: Jul. 13, 2021

(54) BLACK MATRIX COMPOSITION, LIQUID CRYSTAL DISPLAY PANEL AND MANUFACTURING METHOD THEREOF

(71) Applicant: TCL CHINA STAR OPTOELECTRONICS TECHNOLOGY CO., LTD., Guangdong (CN)

(72) Inventor: Bai Bai, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 21 days.

(21) Appl. No.: 16/627,803

(22) PCT Filed: Dec. 27, 2019

(86) PCT No.: PCT/CN2019/129031
§ 371 (c)(1),
(2) Date: Dec. 31, 2019

(30) Foreign Application Priority Data

Dec. 18, 2019 (CN) .......................... 201911312577.5

(51) Int. Cl.
*G02F 1/1362* (2006.01)
*G02F 1/1337* (2006.01)
*G02F 1/01* (2006.01)
*G02F 1/1347* (2006.01)
*G02F 1/1333* (2006.01)

(52) U.S. Cl.
CPC ...... *G02F 1/136209* (2013.01); *G02F 1/0107* (2013.01); *G02F 1/13471* (2013.01); *G02F 1/133788* (2013.01); *G02F 1/133302* (2021.01)

(58) Field of Classification Search
CPC ................................................ G02F 1/136209
USPC ......................................................... 349/110
See application file for complete search history.

(56) References Cited

U.S. PATENT DOCUMENTS

| 5,998,090 | A | * | 12/1999 | Sabnis | ............... | G03F 7/0007 |
| | | | | | | 430/270.1 |
| 6,114,404 | A | * | 9/2000 | Deeken | ............... | C09D 11/102 |
| | | | | | | 106/31.13 |
| 2006/0181208 | A1 | * | 8/2006 | Jeon | ............... | H01J 11/44 |
| | | | | | | 313/582 |
| 2006/0283353 | A1 | * | 12/2006 | Chen | ............... | C09D 11/037 |
| | | | | | | 106/31.57 |

(Continued)

FOREIGN PATENT DOCUMENTS

KR 20030093514 A * 12/2003

*Primary Examiner* — Christopher M Raabe
(74) *Attorney, Agent, or Firm* — Mark M. Friedman (57) ABSTRACT

A black matrix composition, a liquid crystal display panel and a manufacturing method thereof are provided. The black matrix composition is used to form a black matrix layer, and components and percentages by weight of the black matrix composition are: an inorganic filler, and 5% to 10%; an alkali-soluble oligomer, and 5% to 10%; a crosslinking agent, and 5% to 10%; a photopolymerization initiator, and 1%; a thermochromic agent, and 1% to 10%; and a solvent, and 60% to 85%. When the temperature of the black matrix layer is less than 50° C., the black matrix layer is black. When the temperature of the black matrix layer is higher than or equal to 60° C., the black matrix layer is completely transparent.

10 Claims, 3 Drawing Sheets

(56) References Cited

U.S. PATENT DOCUMENTS

| | | | | |
|---|---|---|---|---|
| 2012/0200950 A1* | 8/2012 | Shim | ................... | C09D 183/08 |
| | | | | 359/891 |
| 2015/0168827 A1* | 6/2015 | Yang | ................... | G02F 1/1335 |
| | | | | 430/280.1 |
| 2016/0381821 A1* | 12/2016 | Xiao | ................... | G02F 1/1335 |
| | | | | 361/679.01 |
| 2017/0235186 A1* | 8/2017 | Dong | ................... | G02F 1/1339 |
| | | | | 349/106 |
| 2018/0120627 A1* | 5/2018 | Ni | ................... | G02F 1/133512 |

* cited by examiner

BLACK MATRIX COMPOSITION, LIQUID CRYSTAL DISPLAY PANEL AND MANUFACTURING METHOD THEREOF

FIELD OF INVENTION

The present disclosure relates to the field of display technology, and particularly relates to a black matrix composition, display panel and manufacturing method thereof.

BACKGROUND OF INVENTION

During manufacturing of thin film transistor liquid crystal displays (TFT-LCDs), dropping liquid crystals and sealants on array substrates or color film substrates is needed, afterward assembling and bonding two of the substrates in a vacuum environment, and then curing the sealants. Furthermore, the sealants are used to bond the array substrates and the color film substrates and to protect the middle liquid crystals from affecting by external air and water.

Presently, a curing process of sealants of polymer stabilized vertical alignment liquid crystal display (PSVA-LCD) panels are divided into two steps, that is, firstly using ultraviolet light for curing, and then further achieving a complete curing purpose by heating.

With requirements of display quality of flat-panel displays from people increasing, narrow bezel display panels have gradually become a mainstream of displays. Bezels become narrow and light leakage does not occur, and black matrixes (BM) are generally needed to overlap with the sealants. Because ultraviolet light cannot pass through the black matrixes, ultraviolet light for curing the sealants can only be selected to irradiate from a lateral side of array substrates.

However, a number and a density of metal wiring around display panels become more due to requirements of narrow bezels, and this makes most of light could pass through the metal wiring is actually occluded by metal wiring during curing the sealants by ultraviolet light. This makes intensity of the ultraviolet light be weakened greatly, which causes curing of the sealant to be incomplete. Furthermore, an arrangement density of the metal wiring around a panel changes with different positions, which causes curing rates of the sealants on different regions change unevenly, so that may cause problems such as cell gaps around liquid crystal display panels uneven (Mura), liquid crystal puncture, etc. to occur.

In addition, for polymer stabilized vertical alignment (PSVA) technology, a monomer of liquid crystals reacts at a wavelength ranging from 313 nm to 320 nm. When curing of the sealants is incomplete, photoinitiators and acrylic in the sealants are easy to be separated out and react with the monomers in the liquid crystals, which causes problems such as cell gaps around liquid crystal display panels uneven (Mura), liquid crystal puncture, etc. Meanwhile, lamp tubes irradiate light on a whole face, so energy consumption increases, but the utilization rate is low.

SUMMARY OF INVENTION

The purpose of the present disclosure is to provide a black matrix composition, a display panel and a manufacturing method thereof to solve the technical problems of cell gaps around liquid crystal display panels uneven (Mura), liquid crystal puncture, etc. due to the incomplete and uneven curing of the sealants of liquid crystal display panels existing in the prior art.

In order to realize the purpose mentioned above. The present disclosure provides a black matrix composition used to form a black matrix layer, and components and percentages by weight of the black matrix composition are: an inorganic filler, and 5% to 10%; an alkali-soluble oligomer, and 5% to 10%; a crosslinking agent, and 5% to 10%; a photopolymerization initiator, and 1%; a thermochromic agent, and 1% to 10%; and a solvent, and 60% to 85%.

Furthermore, the inorganic filler is a black carbon, and a particle size of the black carbon ranges from 10 nm to 200 nm.

Furthermore, a molecular weight of the alkali-soluble oligomer ranges from 1000 to 10000, and a structural formula of the alkali-soluble oligomer is at least one selected from the group consisting of:

Furthermore, a structural formula of the crosslinking agent is at least one selected from the group consisting of:

Furthermore, a structural formula of the photopolymerization initiator is at least one selected from the group consisting -continued Furthermore, the thermochromic agent includes at least one of $2Cu(CNS)_2 \cdot 2pyridine$, or ammonium metavanadate.

Furthermore, the solvent includes at least one of ethyl 3-ethoxypropionate, 2-ethoxy-1-methylethyl acetate, 2-Acetoxy-1-methoxypropane, or cyclohexanone.

In order to realize the purpose mentioned above, the present disclosure further provides a display panel, which includes a black matrix layer made by the black matrix composition mentioned hereinabove, an array substrate, a liquid crystal layer, a sealant layer, and a transparent electrode layer. The liquid crystal layer is disposed on a surface of a side of the array substrate and corresponds to a middle section of the array substrate. The sealant layer is disposed on the surface on the side on the array substrate and encircles an edge on the liquid crystal layer. The transparent electrode layer is disposed on surfaces of a side of the liquid crystal layer and the sealant layer away from the array substrate. The black matrix layer is disposed on a surface of a side of the transparent electrode layer away from the array substrate and corresponds to the sealant layer.

In order to realize the purpose mentioned above, the present disclosure further provides a manufacturing method of a display panel, which includes steps as follows: a step of disposing an array substrate, which is disposing the array substrate on a top surface of a carrier table; a step of manufacturing a liquid crystal layer, which is manufacturing the liquid crystal layer on a top surface of the array substrate, wherein the liquid crystal layer corresponds to a middle section of the array substrate; a step of manufacturing a sealant layer, manufacturing the sealant layer on the top surface on the array substrate, wherein the sealant layer encircles an edge of the liquid crystal layer; a step of manufacturing a transparent electrode layer, which is manufacturing the transparent electrode layer on a top surface of the liquid crystal layer and the sealant layer; and a step of manufacturing a black matrix layer, which is manufacturing a black matrix layer on a top surface of the transparent electrode layer, wherein the black matrix layer corresponds to the sealant layer.

Furthermore, after the step of manufacturing the black matrix layer further includes: a step of detecting a temperature, performing a detection process on the temperature of the liquid crystal display panel; and a step of illumination curing, performing an illumination curing process on the sealant layer; wherein in the step of detecting the temperature, when the temperature of the liquid crystal display panel is less than or equal to 50° C., the black matrix layer is black, when the temperature of the liquid crystal display panel is greater than or equal to 60° C., the black matrix layer is transparent.

The beneficial effect of the present disclosure is to provide a black matrix composition, a liquid crystal display panel and a manufacturing method thereof. The black matrix layer is manufactured from the black matrix composition. When the temperature of the black matrix layer is less than or equal to 50° C., the black matrix layer is black. When the temperature of the black matrix layer is higher than or equal to 60° C., the black matrix layer is completely transparent. Therefore, during manufacturing processes of liquid crystal display panels, the liquid crystal display panels are heated into a high temperature, and the black matrix is in a completely transparent state. Ultraviolet light passes through the color film substrate and the transparent electrode layer to irradiate onto the sealant layer, and the illumination curing process is performed on the sealant layer without occluding by a metal wiring layer. This allows the sealant layer to be cured completely and evenly to improve yield of the liquid crystal display panels.

DESCRIPTION OF DRAWINGS

The technical solutions and other advantageous effects of the present invention will be apparent with reference to the following accompanying drawings and detailed description of embodiments of the present disclosure.

DETAILED DESCRIPTION OF PREFERRED EMBODIMENTS

The technical solutions in the embodiments of the present disclosure are clearly and completely described in the following with reference to the accompanying drawings in the embodiments of the present disclosure. Obviously, the described embodiments are only part of the embodiments of the present disclosure, but are not all embodiments of the present disclosure. All other embodiments obtained by those skilled in the art based on the embodiments of the present disclosure without creative efforts are within the scope of the present disclosure.

The following disclosure provides many different embodiments or examples for implementing the different structures of the present disclosure. In order to simplify the disclosure of the present disclosure, the components and configurations of the specific examples are described below.

Of course, they are merely examples and are not intended to limit the present disclosure. In addition, the present disclosure may repeat reference numerals and/or reference numerals in different examples, which are for the purpose of simplicity and clarity, and do not indicate the relationship between the various embodiments and/or arrangements discussed. Moreover, the present disclosure provides embodiments of various specific processes and materials, but one of ordinary skill in the art will recognize the use of other processes and/or the use of other materials.

This embodiment provides a black matrix composition used to form a black matrix layer, and components and percentages by weight of the black matrix composition are: an inorganic filler, 5% to 10%; an alkali-soluble oligomer, 5% to 10%; a crosslinking agent, 5% to 10%; a photopolymerization initiator, 1%; a thermochromic agent, 1% to 10%; and a solvent, 60% to 85%.

Furthermore, the inorganic filler is a black carbon, and a particle size of the black carbon ranges from 10 nm to 200 nm, which has good light shielding performance. Preferably, the particle size of the black carbon ranges from 10 nm to 80 nm. This allows the black carbon in the black matrix layer to be in a monodisperse state and to have good disperse effect, so that makes the light shielding effect of the black matrix layer be more even.

A molecular weight of the alkali-soluble oligomer ranges from 1000 to 10000, and a structural formula of the alkali-soluble oligomer is at least one selected from the group consisting of:

The crosslinking agent includes two or more than two of polymerizable double bond compounds, a structural formula of the polymerizable double bond compounds is at least one selected from the group consisting of:

A structural formula of the photopolymerization initiator is at least one selected from the group consisting of:

The thermochromic agent includes at least one of $2Cu(CNS)_2 \cdot 2pyridine$, or ammonium metavanadate ($NH_4VO_3$).

The solvent includes at least one of ethyl 3-ethoxypropionate, 2-ethoxy-1-methylethyl acetate, 2-Acetoxy-1-methoxypropane, or cyclohexanone.

Figure 1:
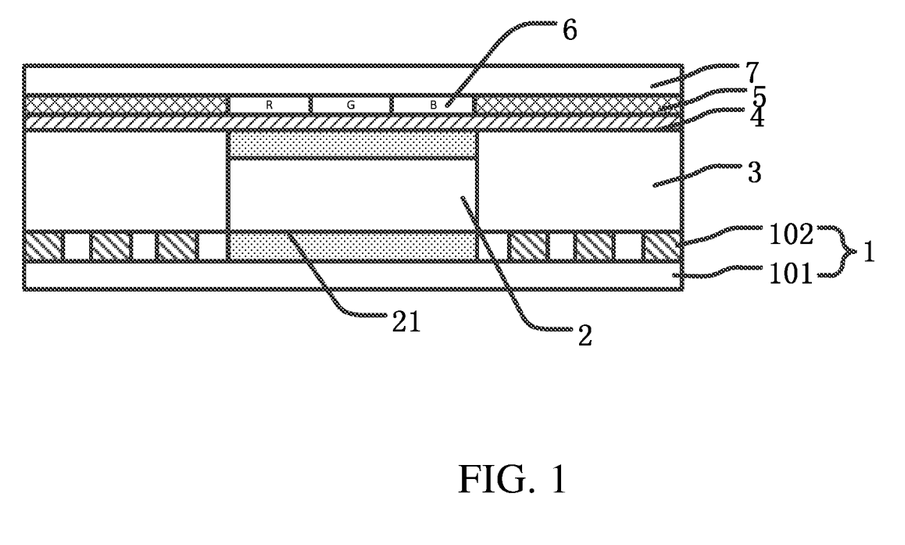
FIG. 1 is a structural schematic diagram of a liquid crystal display panel mentioned in the present disclosure.

As illustrated in FIG. 1, this embodiment further provides a liquid crystal display panel, which includes an array substrate 1, a liquid crystal layer 2, a sealant layer 3, a transparent electrode layer 4, a black matrix layer 5, a pixel definition layer 6, and a color film substrate 7. Furthermore, the liquid crystal display panel is divided into a display region and a non-display region encircling the display region. The display region is a region for displaying images, and no image is displayed on the non-display region.

The array substrate 1 includes a base substrate 101 and a metal wiring layer 102. The metal wiring layer 102 includes a plurality of metal wiring spaced apart on a top surface of the base substrate 101.

The liquid crystal layer 2 is disposed on the top surface of the array substrate 1 and corresponds to a middle section of the array substrate 1. The liquid crystal layer 2 is located on the display region. Two polyimide (PI) substrates 201 are respectively disposed on a top side and a bottom side of the liquid crystal layer 2 to align liquid crystals. The liquid crystals rotate to realize display effect under voltage effect.

The sealant layer 3 is located on the non-display region and is disposed on a top surface of the array substrate 1 in a ring shape, and the sealant layer 3 encircles an edge of the liquid crystal layer 2.

The transparent electrode layer 4 is disposed on top surfaces of the liquid crystal layer 2 and the sealant layer 3. The transparent electrode layer 4 is often an indium tin oxide (ITO) electrode.

The black matrix layer 5 is disposed on a top surface of the transparent electrode layer 4 in a ring shape and corresponds to the sealant layer 3. Materials of the black matrix layer 5 include an inorganic filler, an alkali-soluble oligomer, a crosslinking agent, a photopolymerization initiator, a thermochromic agent, and a solvent. Furthermore, the inorganic filler is a black carbon having good light shielding performance. A particle size of the black carbon ranges from 10 nm to 200 nm. Preferably, the particle size of the black carbon ranges from 10 nm to 80 nm. This allows the black carbon in the black matrix layer 5 to be in a monodisperse state and to have good disperse effect, so that makes the light shielding effect of the black matrix layer 5 be more even.

Furthermore, when the temperature of the black matrix layer 5 is less than or equal to 50° C., the black matrix layer is black. When the temperature of the black matrix layer 5 is greater than or equal to 60° C., the black matrix layer is transparent. Between 50° C. to 60° C., the black matrix layer 5 is a gradually changing process, that is, the black matrix layer 5 changes from black to gray slowly, and becomes transparent finally. Those skilled in the art can perform an illumination curing process on the sealant layer 3 according to the color changing state of the black matrix layer 5.

The pixel definition layer 6 is located on the display region and disposed on the top surface of the transparent electrode layer 4 and corresponds to the liquid crystal layer 2. The pixel definition layer 6 includes a red subpixel, a green subpixel, and a blue subpixel.

The color film substrate 7 is disposed on top surfaces of the black matrix layer 5 and the pixel definition layer 6.

In this embodiment, the black matrix layer is used in the liquid crystal display panel, and the black matrix layer can improve a contrast of the liquid crystal display panel and prevents subpixels in different colors from blending colors to each other, and can also be used to occlude and absorb external incident light to prevent the light from irradiating to an active layer of the thin film transistor, thereby ensuring good off-characteristics of the thin film transistor, and can also occlude gaps between signal lines and other electrode lines on the array substrate to prevent from light leakage to avoid reducing an image contrast.

Figure 2:
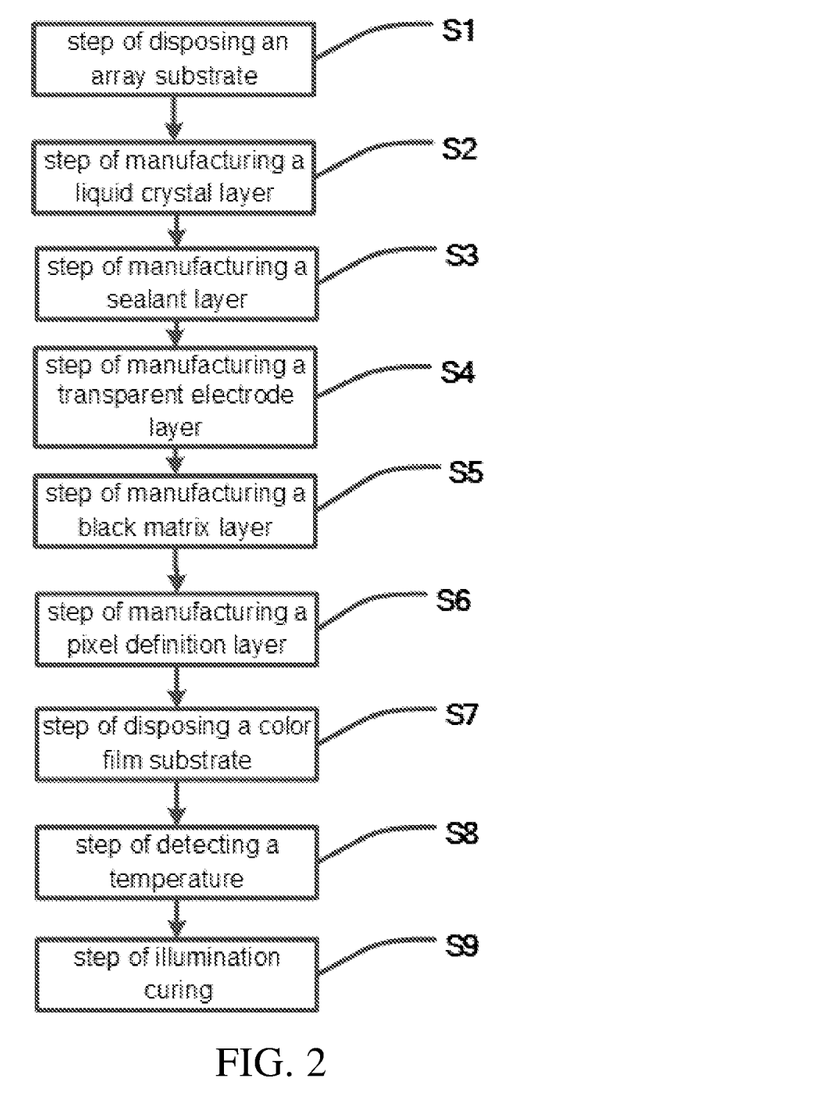
FIG. 2 is a flowchart of the liquid crystal display panel mentioned in the present disclosure.

As illustrated in FIG. 2, this embodiment further provides a manufacturing method of a liquid crystal display panel, including steps S1 to S9 as follows.

Figure 3:
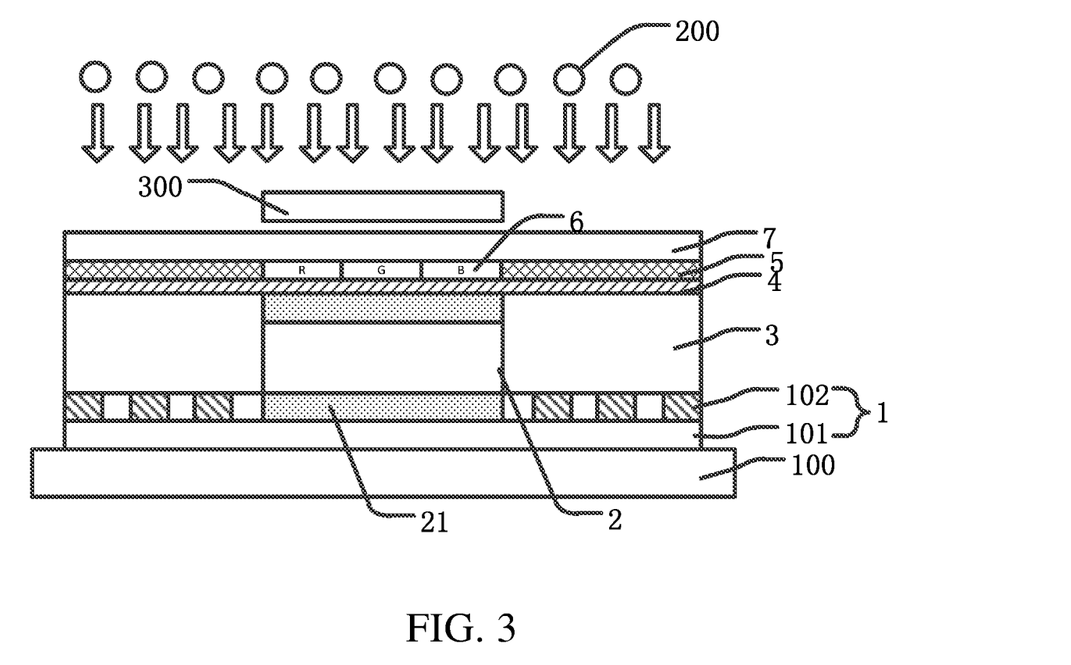
FIG. 3 is a structural schematic diagram of the liquid crystal display panel in a manufacturing process mentioned in the present disclosure.

As illustrated in FIG. 3, S1, a step of disposing an array substrate is disposing the array substrate 1 on a top surface of a carrier table 100. The array substrate includes a base substrate and a metal wiring layer. The metal wiring layer includes a plurality of metal wiring spaced apart on a top surface of the base substrate.

Refer to FIG. 3, S2, a step of manufacturing a liquid crystal layer is manufacturing the liquid crystal layer 2 on a top surface of the array substrate 1. The liquid crystal layer 2 corresponds to a middle section of the array substrate 1. Furthermore, two polyimide (PI) substrate 201 are respectively disposed on a top side and a bottom side of the liquid crystal layer 2 to align liquid crystals. The liquid crystals rotate to realize display effect under voltage effect.

Refer to FIG. 3, S3, a step of manufacturing a sealant layer is manufacturing the sealant layer 3 on the top surface on the array substrate 1, and the sealant layer 3 encircles an edge of the liquid crystal layer 2. Preferably, a layer of an optically clear adhesive (OCA) is coated on a top surface of the array substrate. The optically clear adhesive has a good transparent ability, a high adhesive force, water resistance, high-temperature resistance, and an anti-ultraviolet light ability.

Refer to FIG. 3, S4, a step of manufacturing a transparent electrode layer is manufacturing the transparent electrode layer 4 on top surfaces of the liquid crystal layer 2 and the sealant layer 3. The transparent electrode layer is transparent and has a good light transmittance rate.

Refer to FIG. 3, S5, a step of manufacturing a black matrix layer is manufacturing the black matrix layer 5 on a top surface of the transparent electrode layer 4, and the black matrix layer 5 corresponds to the sealant layer 3. Furthermore, materials of the black matrix layer include an inorganic filler, an alkali-soluble oligomer, a crosslinking agent, a photopolymerization initiator, a thermochromic agent, and a solvent. In this embodiment, the inorganic filler is a black carbon having good light shielding performance. A particle size of the black carbon ranges from 10 nm to 200 nm. Preferably, the particle size of the black carbon ranges from 10 nm to 80 nm. This allows the black carbon in the black matrix layer to be in a monodisperse state and to have good disperse effect, so that makes the light shielding effect of the black matrix layer be more even.

Refer to FIG. 3, S6, a step of manufacturing a pixel definition layer is manufacturing the pixel definition layer 6 on the top surface of the transparent electrode layer 4, and the pixel definition layer 6 corresponds to the liquid crystal layer 2.

Refer to FIG. 3, S7, a step of disposing a color film substrate is disposing a color film substrate 7 on top surfaces of the black matrix layer 5 and the pixel definition layer 6. Furthermore, the color film substrate is a transparent substrate having a good light transmittance rate.

S8, a step of detecting a temperature is performing a detection process on a temperature of the carrier table. It should be noted that the carrier table has a temperature detection device inside to detect change of a temperature of the liquid crystal display panel. When the temperature of the liquid crystal display panel is less than or equal to 50° C., the black matrix layer is black, when the temperature of the liquid crystal display panel is greater than or equal to 60° C., the black matrix layer is transparent. Between 50° C. to 60° C., the black matrix layer is a gradually changing process, that is, the black matrix layer changes from black to gray slowly, and becomes transparent finally. Those skilled in the art can perform a next-step illumination curing process on the sealant layer according to the color changing state of the black matrix layer.

S9, a step of illumination curing is performing an illumination curing process on the sealant layer.

Refer to FIG. 3, lamp tubes 200 are disposed on the color film substrate, and a mask plate 300 is used to perform a mask process on the liquid crystal display panel. The lamp tubes are ultraviolet (UV) lamp tubes, which emits invisible light, and the invisible light is an electromagnetic radiation out of visible purple light.

In this embodiment, when the temperature of the liquid crystal display panel detected by the temperature detection device is less than or equal to 50° C., the black matrix layer is black, and the liquid crystal display panel can be continued heating. When the temperature of the liquid crystal display panel is greater than or equal to 60° C., the black matrix layer is transparent, the mask plate can be used to perform the illumination curing process on the sealant layer. Specifically, the array substrate transfers heat from the sealant layer to the black matrix layer by a heat transfer method. After the temperature of the black matrix layer is increased, the black matrix layer slowly changes from black to a transparent state. When the temperature of the liquid crystal display panel is greater than or equal to 60° C., the black matrix layer is completely transparent. At this time, the ultraviolet light can pass through the color film substrate and the transparent electrode layer to irradiate on the sealant layer and to perform the illumination curing process on the sealant layer. Because the sealant layer is not occluded by any component, it can be cured rapidly and evenly and bonds each adjacent film layer together tightly, so that suppresses problems of unevenness of a cell gap of the liquid crystal layer and liquid crystal puncture to occur. It should be noted that in this embodiment, the color film substrate and the transparent electrode layer are transparent and have a good light transmittance rate. Therefore, ultraviolet light can be directly irradiated on the sealant layer and makes the sealant layer be fully cured. This allows the liquid crystal display panel to have good sealability, and not only suppresses occurrence of problems such as unevenness of cell gaps of the liquid crystal display panel (Mura), liquid crystal puncture, etc., but also enables to isolate water/oxygen to prolong service life of the liquid crystal display panel.

After manufacturing of the liquid crystal display panel is completed, the temperature of the liquid crystal display panel is decreased to a room temperature. The black matrix layer becomes a black intransparent state from the transparent state. Therefore, when the liquid crystal display panel is used normally, the liquid crystal display panel has good light shielding performance, and this can improve a contrast of the liquid crystal display panel and prevents subpixels in different colors from blending colors to each other, and can also be used to occlude and absorb external incident light to prevent the light from irradiating to an active layer of the thin film transistor, thereby ensuring good off-characteristics of the thin film transistor, and can occlude gaps between signal lines and other electrode lines on the array substrate to prevent from light leakage to avoid reducing of an image contrast.

Figure 4:
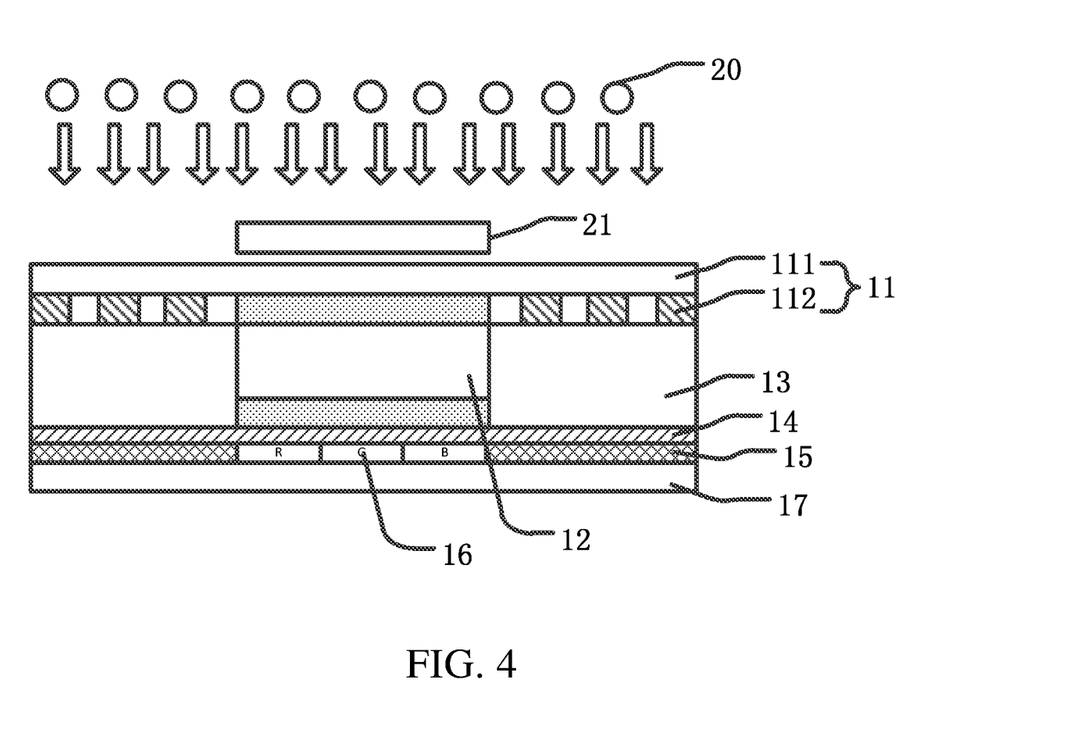
FIG. 4 is a structural schematic diagram of a liquid crystal display panel in the prior art.

As illustrated in FIG. 4, which is a structural schematic diagram of a liquid crystal display panel in the prior art. The liquid crystal display panel includes an array substrate 11, a liquid crystal layer 12, a sealant layer 13, a transparent electrode layer 14, a black matrix layer 15, a pixel definition layer 16, and a color film substrate 17. From the figure, it can be understood that the black matrix layer 15 is disposed on a top surface of the color film substrate 17 in a ring shape and is close to an edge of the color film substrate 17. The pixel definition layer 16 is disposed on the top surface of the color film substrate 17 and corresponds to a middle section of the color film substrate 17. The transparent electrode layer 14 is disposed on top surfaces of the black matrix layer 15 and the pixel definition layer 16. The liquid crystal layer 12 is disposed on a top surface of the transparent electrode layer 14 and corresponds to the pixel definition layer 16. The sealant layer 13 is disposed on the top surface of the transparent electrode layer 14 and corresponds to the black matrix layer 15. The array substrate 11 is disposed on top surfaces of the sealant layer 13 and the liquid crystal layer 12. Furthermore, the array substrate 11 includes a base substrate 111 and a metal wiring layer 112. The metal wiring layer 112 is disposed on the top surface of the sealant layer 13. The base substrate 111 is disposed on the top surfaces of the metal wiring layer 112 and the liquid crystal layer 12. During performing the illumination curing process on the sealant layer, after the ultraviolet light passes through the array substrate, performing the curing process on the sealant layer 13. Because metal wiring of the array substrate is easy to occlude the ultraviolet light, this makes curing of the sealant layer 13 is incomplete and uneven, and easily causes technical problems such as cell gaps around liquid crystal display panels uneven (Mura), liquid crystal puncture, etc.

Comparing the present disclosure to the prior art, during the manufacturing process the liquid crystal display panel, when the temperature of the liquid crystal display panel is greater than or equal to 60° C., the black matrix layer is in a complete transparent state, and the ultraviolet light can pass through the transparent color film substrate and the transparent electrode layer to irradiate onto the sealant layer. The ultraviolet light will not be occluded by any components (such as a metal wiring layer), and this makes the sealant layer be fully and evenly cured.

The present disclosure provides a black matrix composition, a liquid crystal display panel and a manufacturing method thereof. The black matrix layer is manufactured from the black matrix composition. When the temperature of the black matrix layer is less than or equal to 50° C., the black matrix layer is black. When the temperature of the black matrix layer is higher than or equal to 60° C., the black matrix layer is completely transparent. Therefore, during manufacturing processes of liquid crystal display panels, the liquid crystal display panels are heated into a high temperature. The black matrix is in a completely transparent state, and ultraviolet light passes through the color film substrate and the transparent electrode layer to irradiate onto the sealant layer, and the illumination curing process is performed on the sealant layer without occluding by a metal wiring layer. This allows the sealant layer to be cured completely and evenly to improve yield of the liquid crystal display panels.

In the above embodiments, the description of each embodiment has its emphasis, and for some embodiments that may not be detailed, reference may be made to the relevant description of other embodiments.

The black matrix composition, the liquid crystal display panel and the manufacturing method thereof provided by the present disclosure are described in detail above. This article uses specific cases for describing the principles and the embodiments of the present disclosure, and the description of the embodiments mentioned above is only for helping to understand the method and the core idea of the present disclosure. It should be understood by those skilled in the art, that it can perform changes in the technical solution of the embodiments mentioned above, or can perform equivalent replacements in part of technical characteristics, and the changes or replacements do not make the essence of the corresponding technical solution depart from the scope of the technical solution of each embodiment of the present disclosure.

What is claimed is:

1. A black matrix composition used for forming a black matrix layer, wherein components and percentages by weight of the components of the black matrix composition are: an inorganic filler, and a percentage by weight of the inorganic filler ranging from 5% to 10%; an alkali-soluble oligomer, and a percentage by weight of the alkali-soluble oligomer ranging from 5% to 10%; a crosslinking agent, and a percentage by weight of the crosslinking agent ranging from 5% to 10%; a photopolymerization initiator, and a percentage by weight of the photopolymerization initiator is 1%; a thermochromic agent, and a percentage by weight of the thermochromic agent ranging from 1% to 10%; and a solvent, and a percentage by weight of the solvent ranging from 60% to 85%.

2. The black matrix composition as claimed in claim 1, wherein the inorganic filler is a black carbon, and a particle size of the black carbon ranges from 10 nm to 200 nm.

3. The black matrix composition as claimed in claim 1, wherein a molecular weight of the alkali-soluble oligomer ranges from 1000 to 10000, and a structural formula of the alkali-soluble oligomer is at least one selected from the group consisting of:

4. The black matrix composition as claimed in claim 1, wherein a structural formula of the crosslinking agent is at least one selected from the group consisting of:

5. The black matrix composition as claimed in claim 1, wherein a structural formula of the photopolymerization initiator is at least one selected from the group consisting of:

-continued

6. The black matrix composition as claimed in claim 1, wherein the thermochromic agent comprises at least one of $2Cu(CNS)_2 \cdot 2pyridine$, or ammonium metavanadate.

7. The black matrix composition as claimed in claim 1, wherein the solvent comprises at least one of ethyl 3-ethoxypropionate, 2-ethoxy-1-methylethyl acetate, 2-Acetoxy-1-methoxypropane, or cyclohexanone.

8. A liquid crystal display panel, comprising:
   a black matrix layer, wherein which is made by the black matrix composition as claimed in claim 1;
   an array substrate;
   a liquid crystal layer disposed on a surface of a side of the array substrate and corresponding to a middle section of the array substrate;
   a sealant layer disposed on the surface on the side on the array substrate and encircling an edge on the liquid crystal layer;
   a transparent electrode layer disposed on surfaces of a side of the liquid crystal layer and the sealant layer away from the array substrate; and
   wherein the black matrix layer is disposed on a surface of a side of the transparent electrode layer away from the array substrate and corresponds to the sealant layer.

9. A manufacturing method of the liquid crystal display panel as claimed in claim 8, comprising:
   disposing an array substrate on a top surface of a carrier table;
   manufacturing a liquid crystal layer on a top surface of the array substrate, wherein the liquid crystal layer corresponds to a middle section of the array substrate;
   manufacturing a sealant layer on the top surface on the array substrate, wherein the sealant layer encircles an edge of the liquid crystal layer;
   manufacturing a transparent electrode layer on a top surface of the liquid crystal layer and the sealant layer; and manufacturing a black matrix layer on a top surface of the transparent electrode layer, wherein the black matrix layer corresponds to the sealant layer.

10. The manufacturing method of the display panel as claimed in claim 9, wherein after manufacturing the black matrix layer on the top surface of the transparent electrode layer comprises:

performing a detection process on a temperature of the liquid crystal display panel; and performing an illumination curing process on the sealant layer;

wherein in performing the detection process on the temperature of the liquid crystal display panel, when the temperature of the liquid crystal display panel is less than or equal to 50'C, the black matrix layer is black, when the temperature of the liquid crystal display panel is greater than or equal to 60'C, the black matrix layer is transparent.

* * * * *